United States Patent [19]

Lang et al.

[11] 4,280,802

[45] Jul. 28, 1981

[54] SCREW-TYPE EXTRUDER FOR POLYVINYLIDENE FLUORIDE FILAMENTS

[75] Inventors: Egon Lang, Troisdorf-Oberlar; Wilhelm Nachtigall, Troisdorf-Eschmar, both of Fed. Rep. of Germany

[73] Assignee: Dynamit Nobel Aktiengesellschaft, Troisdorf, Fed. Rep. of Germany

[21] Appl. No.: 123,645

[22] Filed: Feb. 22, 1980

[30] Foreign Application Priority Data

Feb. 23, 1979 [DE] Fed. Rep. of Germany ....... 2907074

[51] Int. Cl.$^3$ .............................................. B29B 1/06
[52] U.S. Cl. ................................ 425/208; 264/176 F; 366/323; 425/71
[58] Field of Search ............... 425/208, 204; 366/323; 264/349, 176 F

[56] References Cited

U.S. PATENT DOCUMENTS

| 3,248,469 | 4/1966 | Kosiasky et al. | 425/208 |
|---|---|---|---|
| 3,664,795 | 5/1972 | Heinz et al. | 425/208 |
| 3,676,034 | 7/1972 | Wendricks | 425/208 |
| 3,867,079 | 2/1975 | Kim | 425/208 |
| 3,913,897 | 10/1975 | Hansilk | 425/208 |
| 3,941,860 | 3/1976 | Couchoud et al. | 264/240.7 |
| 4,015,832 | 4/1977 | Kruder | 425/208 |
| 4,092,015 | 5/1978 | Koch | 425/208 |
| 4,129,386 | 12/1978 | Rauwendaal | 425/208 |
| 4,173,417 | 11/1979 | Kruder | 425/208 |

FOREIGN PATENT DOCUMENTS

441732 1/1968 Switzerland ........................... 264/349

Primary Examiner—Jay H. Woo
Attorney, Agent, or Firm—Craig and Antonelli

[57] ABSTRACT

An apparatus for the continuous manufacture of filaments from polyvinylidene fluoride includes a screw extruder with a single-spindle screw surrounded by a coaxial barrel with a feed zone, a compression zone, a metering zone, and a mixing head zone for the plasticizing of the polyvinyldene fluoride and with a die outlet tool for shaping the filaments. The compression ratio of the screw is 1:1.2 to 1:2.5, and the screw is provided with single-flight and double-flight sections of identical pitch in alternating succession in the region of the compression zone. The mixing head zone is fashioned as alternatingly successive mixing zones and shear zones, of which there are provided, respectively, two to four zones and preferably three zones.

20 Claims, 5 Drawing Figures

SCREW-TYPE EXTRUDER FOR POLYVINYLIDENE FLUORIDE FILAMENTS

The invention relates to an apparatus for the continuous manufacture of filaments from polyvinylidene fluoride comprising a screw extruder with a single-spindle screw surrounded by a coaxial barrel with a feed zone, a compression zone, a metering zone, and a mixing head zone for the plasticizing of the polyvinylidene fluoride and with a die outlet tool for shaping the filaments.

Conventional arrangements for the extrusion of plastic filaments have been described, for example, in the book by Dr. -Ing. Schenkel, "Kunststoff-Extrudertechnik"[Synthetic Resin Extruder Technology], Carl Hanser publishers, Munich, 1963, pages 438-444. It is important in the manufacture of the filaments to obtain a smooth surface, a satisfactory stretchability and a minimum of deviations from a given diameter, i.e. a maximally high degree of roundness in case of monofilaments to be fashioned with circular cross sections. In this connection, an essential prerequisite is a satisfactory plasticization of the polyvinylidene fluoride in an extruder. Since polyvinylidene fluoride is a partially crystalline thermoplastic synthetic resin, the degree of crystallinity of which depends substantially on the thermal pretreatment, sufficient attention must also be devoted to the plasticizing of this material, so that it is possible to extrude filaments having a maximally high dimensional stability, on the one hand, and satisfactory stretchability, on the other hand, the filaments exhibiting a high degree of crystallinity. Moreover, high requirements must be met by the dimensional accuracy of the filaments to be extruded, which normally cannot be achieved with single-screw extruders, unless additional use is made of melt gear pumps to increase the feeding constancy, or of subsequently connected calibrating means.

The invention is based on the problem of providing a screw-type extruder with a single-spindle screw for the extrusion of polyvinylidene fluoride, making it possible to plasticize the polyvinylidene fluoride satisfactorily and to simultaneously produce maximally dimensionally accurate filaments at a high conveying constancy with trueness of cross section in a continuous operation, and a diameter of the extruded filaments from 0,1 to 3 mm.

This problem has been solved by means of the apparatus of this invention by providing that this apparatus has a compression ratio of the screw of 1:1.2 to 1:2.5 and by arranging in the region of the compression zone successively alternating single-flight and double-flight sections of equal pitch, and by providing the mixing head zone with a number of successively alternating mixing zones and shear zones, that is, two to four, and preferably three mixing zones and three shear zones. The screw constructed according to this invention achieves the objective of manufacturing polyvinylidene fluoride into filaments having smooth surfaces, with flawless plasticization and very low fluctuations in diameter. This accomplishment is due to the fact that the screw is adapted in its construction to the specific rheological properties of the polyvinylidene fluoride melt, especially, on the one hand, the construction of the single-spindle screw with partial sections as a double-flight screw and, on the other hand, the use of a specifically fashioned mixing head with mixing zones and shear zones. The mixing head, in particular, effects an increase in the uniform conveying constancy and reduces the tolerances of the exiting profiled filaments.

An advantageous embodiment of the screw comprising single-flight and double-flight sections provides that the land of the single-flight section is ending for the first time approximately at the end of the first third of the screw, i.e. approximately at the end of the feed zone. The land is then continued by a new land offset by 180°, so that the end of the first land and the first part of the second land extend in a double-thread fashion over 180°, with the channel width of the single-flight section being cut in half. Such division in the land with a screw having a double thread at intervals is preferably provided twice to four times within the middle region of the screw constituting essentially the compression zone. By means of these land interruptions and double-thread flight configuration, the objective is attained that the polyvinylidene melt is divided and turned over and thus total plasticization is improved.

It is thus possible by means of the invention to plasticize polyvinylidene fluoride perfectly with the use of a screw extruder with a screw constructed according to the single-spindle principle, due to the special construction of this screw, and to extrude this material at high dimensional accuracy with diameters of the filaments from preferably 0,1 to 3 mm.

The mixing head of the screw, subdivided according to the invention into shear zones and mixing zones, takes over the task to completely break up the polyvinylidene fluoride and additionally to exert a favorable influence on the conveying constancy by a controlled pressure buildup in the shear zones. An especially advantageous effect on the uniform discharge of the polyvinylidene fluoride from the screw extruder is attained by the alternating succession of mixing zones and shear zones.

An advantageous embodiment of each mixing zone resides in that the zone is formed by cams or projections arranged in ring shape on the screw, i.e. in an annular arrangement. Preferably three cam rings are provided for each mixing zone, wherein the cam lengths and the mutual spacing of the cam rings are selected to be of identical size. Preferably 6-30, preferably 18-24 cams are formed in each cam ring. The shear zone is preferably fashioned as a ring, wherein the ring diameter is selected to be between the core diameter of the screw and the outer diameter of the cams. The die follows the mixing head zone of the screw extruder, this die having an appropriate profile configuration for the filaments to be extruded.

In conjunction with the extrusion of polyvinylidene fluoride, the following dimensions are to be preferably chosen for the screw: a length of the screw equal to 20-35 screw diameters, preferably 27-30 screw diameters, with a screw diameter of 25-90 mm. The length of the mixing head zone is to be 2-6 times, preferably 3.5 times the screw diameter. The feed zone is 6-10 screw diameters, the compression zone is 5-10 screw diameters, the metering zone is 10-15 screw diameters. The length of a mixing zone can be, in this connection, 0.5-1.5, preferably 0.8 times the screw diameter, and the length of a shear zone can be 0.1-0.5, preferably 0.25 times the screw diameter. The spacing between two double-flight sections is between 3 and 5 screw diameters, preferably 4 screw diameters.

The invention is illustrated in one embodiment in the drawings and will be explained in greater detail with reference thereto wherein.

Figure 1:
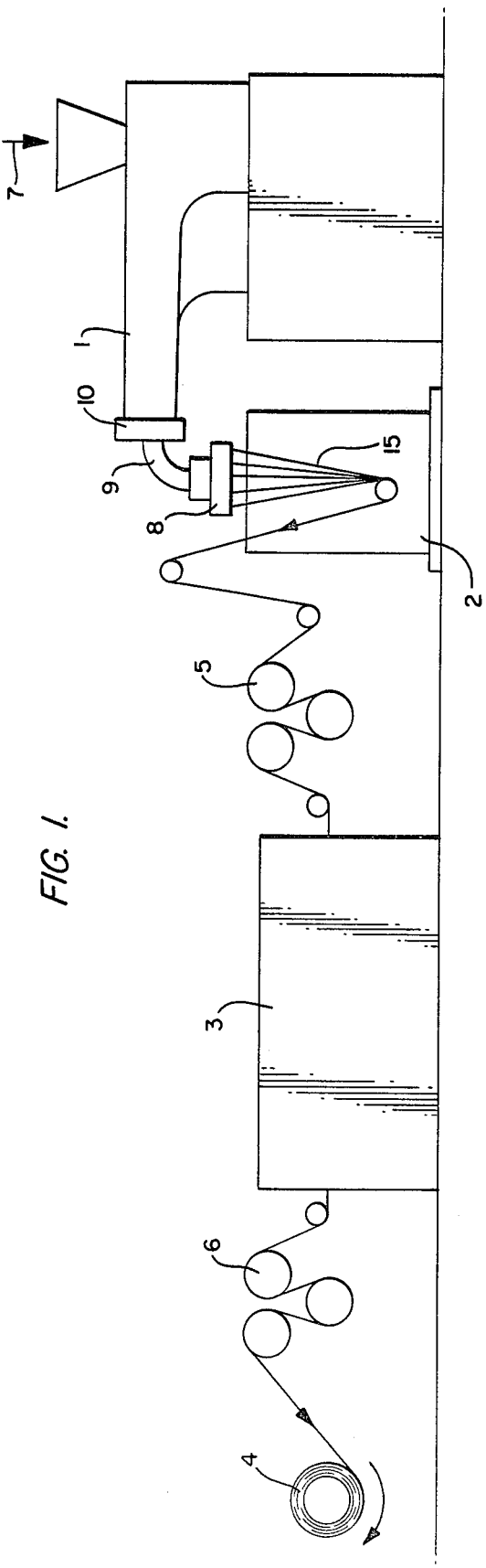
FIG. 1 shows schematically a plant for the manufacture of polyvinylidene fluoride filaments by extrusion.

FIG. 1 is a schematic view of a plant for the manufacture of polyvinylidene fluoride mono-filaments wherein the polyvinylidene fluoride is plasticized in extruder 1 at, for example, 275° C. and conveyed by way of the extruder orifice relief 10 via the elbow 9 to the die outlet tool 8 and formed into the filaments 15. Subsequently, the filaments 15 are conducted separately through a cooling bath 2 and conveyed via guide rolls 5 to a drawing device 3, after which the filaments are wound separately on the windup means 4 by way of a further take-off means 6. The material is fed into extruder 1 in the direction of arrow 7. The present invention concerns exclusively the construction of the extruder 1, i.e. the extruder screw device for plasticizing, more particularly for plasticizing, the polyvinylidene fluoride chips, granules or like particulate material.

Figure 2:
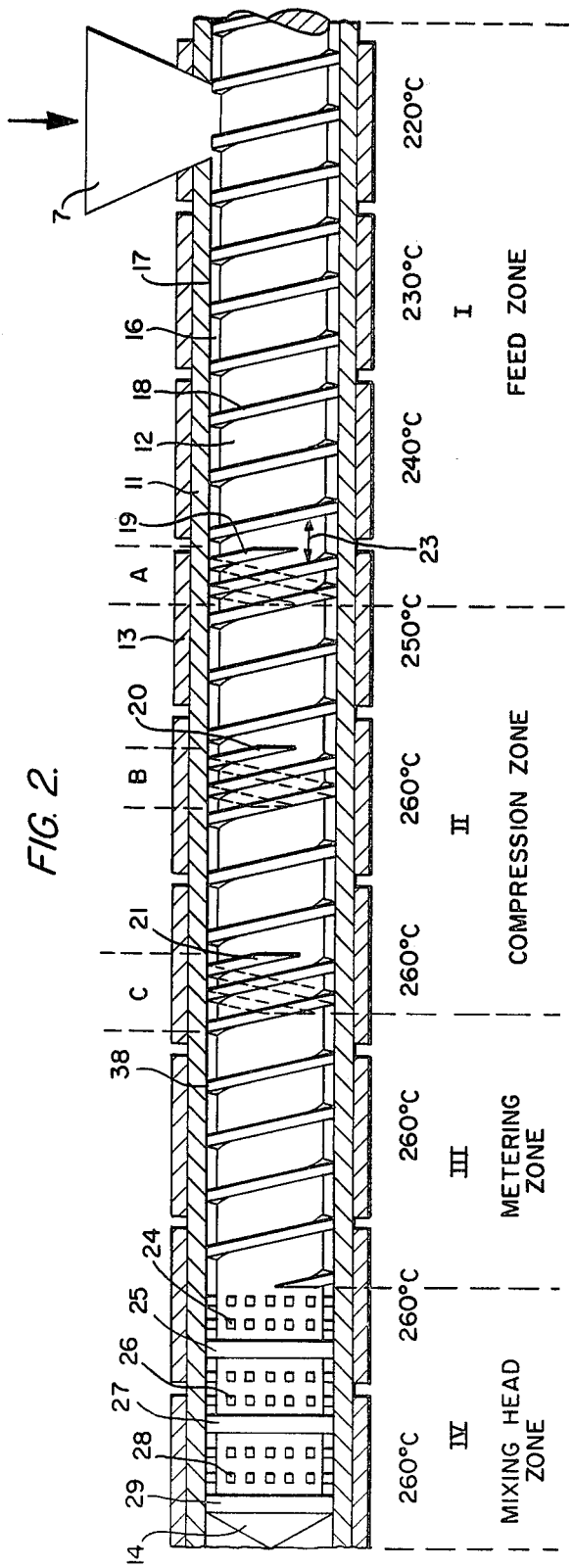
FIG. 2 is a schematic cross section through a single-spindle screw extruder.

The single-spindle screw 12, constructed according to this invention, as illustrated schematically in cross section in FIG. 2, is provided for attaining the desired homogeneous plasticization of the polyvinylidene fluoride and a high conveying constancy in order to manufacture dimensionally accurate products. The screw comprises the feed zone I with the filling hopper for the introduction of the polymeric material 7, the compression zone II, the metering zone III, and the mixing head zone IV. The screw preferably has a screw length of 20–35 screw diameters, preferably 29 screw diameters, with a screw diameter of between 15 and 90 mm, preferably 40–70 mm. The screw core diameter increases from the feed zone to the metering zone by about 10–15%. The compression of the screw is chosen to be between 1:1.2 and 1:2.5, preferably 1:1.8. A preferable embodiment of the screw provides the following dimensions, for example:

Screw diameter D 60 mm.;
screw core diameter at the beginning 39 mm.;
screw core diameter at the end 50 mm.;
total screw length 32.5 D; of this value, 7 D represents the feed zone, 8.5 D represents the compression zone, 13.5 D represents the metering zone, and 3.5 D represents the mixing head zone.

In this case, the compression ratio of the screw is 1:1.28; the screw is single-flight and has a channel depth in the feed zone of 10.5 mm. and a pitch of 60 mm.

The screw 12 is surrounded by the coaxial cylindrical barrel 11, wherein the gap 16 represents half the screw clearance and is formed by the distance between the screw core diameter 17 and the barrel 11. The zones I through IV constitute the screw length. The external screw diameter 38 is formed by the lands making up the flights. The first single-flight section of screw 12 has the land 18 in the feed zone, this land is ending in the transition region to the compression zone II, where a second land 19 begins offset by 180° in double-flight fashion with the first land 18, thus halving the channel width 23. This second land 19 overlaps with the first land 18 by 180° and thus forms a double-flight in this region. After a certain distance, the land 19 is ending and another land 20 starts, overlapping the ending land 19 by 180° and forming another double-flight. The land 20 ends again at the end of the compression zone, being continued by overlapping by 180° with the land 21 up to the mixing head. The, respectively, double-flight-type sections of the screw are identified by the letters A, B and C and are located approximately in the middle third of the screw. It is also possible only to provide two or even four of such double-thread or flight sections. The overlapping or double-flight periods are preferably at least by 180°, but may be larger up to 360°.

On the outside, the barrel 11 of the screw is equipped with heating units 13, the temperatures thereof being indicated in the individual heating sections. The mixing head zone is fashioned, alternatingly, as a mixing zone 24, 26, 28 and a shear zone 25, 27, 29 with the tip 14 of the screw forming the end portion of the screw.

Figure 3:
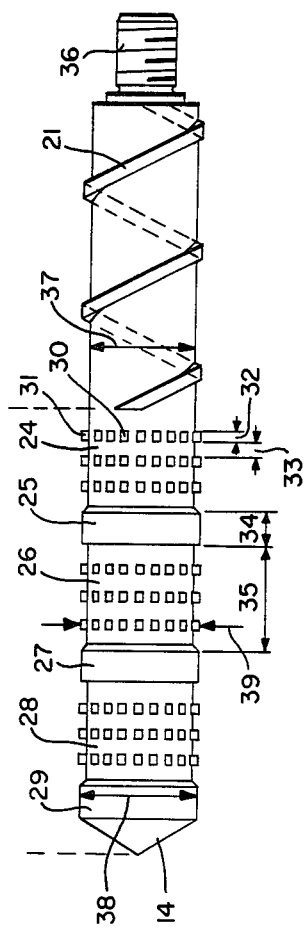
FIG. 3 is a plan view of a mixing head of FIG. 2 in greater detail.

In FIG. 3, the mixing head or the mixing zone IV is illustrated in greater detail. The mixing zones 24, 26, 28 are fashioned in an identical manner with respectively three cam rings or rows 31 from cams or projections 30. The cam length 32 and the spacing 33 of the cam rings from one another are selected to be preferably of equal size. However, it is also possible, as shown in FIG. 2, to provide in each case only two cam ring within one mixing zone. The shear zones 25, 27, 29 are constituted by cylindrical rings. The length 34 of the shear zone is substantially shorter than the length 35 of the mixing zone. In this connection, the conditions are generally that the shear zones are 0.5 to 1.5 times the screw diameter in length, whereas the length of the mixing zones is to be 0.1 to 0.5 times the screw diameter. The spacing from the cam ring adjacent to the respective mixing zone also corresponds approximately to the spacing of the cam rings from one another. Half the screw clearance between the annular shear zones 25, 27 and the barrel 11 of the screw is between 0.8 and 2.5, preferably 1.5 mm. The mixing head is firmly connected to the remainder of the screw spindle by way of the pin 36. The core diameter 37 of the screw illustrated herein is somewhat larger than the core diameter of the screw in the feed zone. Numeral 39 denotes the outer diameter of the cam rings 31.

For the embodiment of the single screw spindle mentioned hereinabove, the mixing zone would then be constructed so that, with a total length of the mixing head zone of 210 mm., there are provided respectively three mixing zones having a length of 48 mm. with, respectively, three cam rows of respectively 20 cams. The shear zones interposed and connected thereafter are each 15 mm. long, wherein the shear gap, i.e. half the screw clearance between shear zone and barrel housing is 1.5 mm. With a thus-constructed single-spindle screw, it is possible, for example, with a throughput of 100 kg./h. of polyvinylidene fluoride, to extrude flawless filaments having low fluctuations in diameter and a high dimensional stability.

Figure 4:
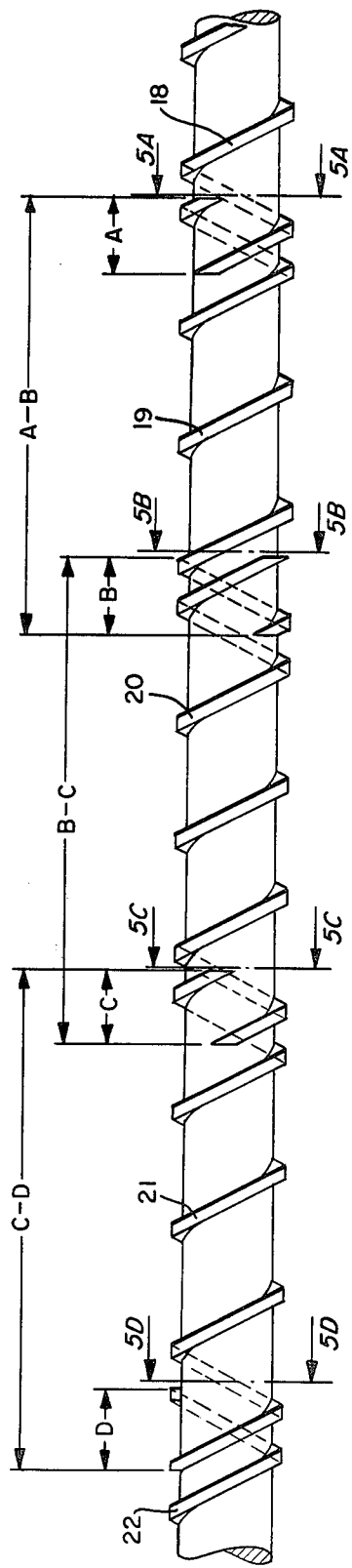
FIG. 4 is a fragmentary, more detailed view of the compression zone of the screw according to FIG. 2.
Figure 5:
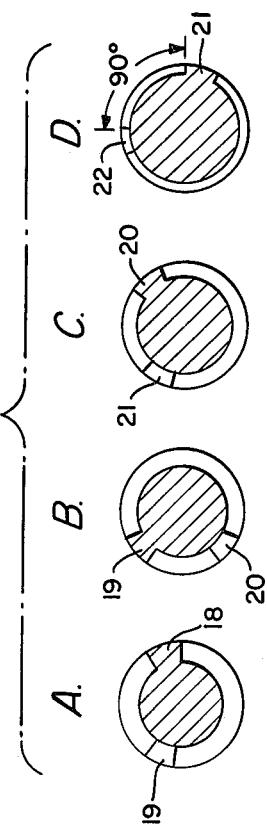
FIG. 5 shows four cross sections of the screw according to FIG. 4.

FIG. 4 shows as a partial view in a dimensionally different illustration the portion of screw 12 fashioned in sections to be of a double flight with identical pitch in sections A, B, C, and D. In this connection, the distances from the beginning to the end of a land 19, 20, 21 are of identical length, which is characterized by the lengths A–B, B–C, and C–D. FIG. 5 shows elevational views of sections taken in FIG. 4 along A—A, B—B, C—C, and D—D, illustrating the, respectively, offset arrangement of the additional land which provides the double-flight feature.

The above-described apparatus makes it possible to manufacture polyvinylidene fluoride filaments of a smooth surface and satisfactory stretchability, with low fluctuations in diameter, due to the homogeneous plasticization and high conveying constancy of the apparatus of this invention.

What is claimed is:

1. An apparatus for the continuous manufacture of filaments from polyvinylidene fluoride comprising a screw extruder with a single-spindle screw surrounded by a coaxial barrel with a feed zone, a compression zone, a metering zone, and a mixing head zone for the plasticizing of the polyvinylidene fluoride and with a die outlet tool for shaping the plasticized polyvinylidene fluoride into filaments, characterized in that the compression ratio of the screw is 1:1.2 to 1:2.5, that single-flight and double-flight sections of identical pitch are provided in alternating succession in the compression zone, and that the mixing head zone is provided with a plurality of alternatingly successive mixing zones and shear zones.

2. An apparatus according to claim 1, characterized in that a single-flight land providing a single flight section in the feed zone is interrupted for the first time approximately at the end of the first third of the length of the screw, which corresponds approximately to the end of the feed zone.

3. An apparatus according to claim 2, characterized in that a single-flight land is interrupted twice to four times in the compression zone by another single-flight land to provide a double-flight section over 180°, another single-flight land being offset toward the rear of the screw by 180°, with the channel width of the single-flight land being halved in the double-flight section.

4. An apparatus according to claim 1, characterized in that the mixing zones are provided with a plurality of separate projections arranged in rings on the screw.

5. An apparatus according to claim 4, characterized in that each mixing zone has two to three rings of said projections, and the projection length and the mutual spacing of the projection rings are approximately of the same size.

6. An apparatus according to claim 4 or 5, characterized in that 6-30, projections are provided per ring.

7. An apparatus according to claim 1, characterized in that the screw length is 20-35 times the screw diameter D, with the screw diameter D being 25-90 mm.

8. An apparatus according to claim 1, characterized in that the mixing head zone is 2-6 times the outside diameter D of the screw.

9. An apparatus according to claim 8, characterized in that the length of the feed zone is 6-10 D, the length of the compression zone is 5-10 D, and the length of the metering zone is 10-15 D.

10. An apparatus according to claim 3, characterized in that the length of a mixing zone is 0.5-1.5 times the screw diameter D, and the length of a shear zone is 0.1-0.5 times the screw diameter D.

11. An apparatus according to claim 4, characterized in that the shear zone is provided by a continuous ring-shaped single projection, wherein the diameter of the ring-shaped projection lies between the core diameter of the screw and the outer diameter of the projections in the mixing zone.

12. An apparatus according to claim 1, characterized in that the spacing between two double-flight sections is between 3 and 5 times the screw diameter D.

13. An apparatus according to claim 1 characterized in that the single-spindle screw has a constant diameter D.

14. An apparatus according to claim 1, characterized in that the mixing head zone has 2 to 4 mixing zones alternately arranged with 2 to 4 shear zones.

15. An apparatus according to claim 1, characterized in that the mixing head zone has three mixing zones alternately arranged with three shear zones.

16. An apparatus according to claim 7, characterized in that the screw length is 27-30 times the screw diameter D, with the screw diameter D being 25-90 mm.

17. An apparatus according to claim 1, characterized in that the mixing head zone is 3.5 times the outside diameter D of the screw.

18. An apparatus according to claim 8, characterized in that the length of a mixing zone is 0.8 times the screw diameter and the length of a shear zone is 0.25 times the screw diameter D.

19. An apparatus according to claim 1, characterized in that the spacing between two double-flight sections is 4 times the screw diameter D.

20. An apparatus according to claim 3, wherein the feed zone and the metering zone are each provided with a single flight section, each of said single-flight sections including a single-flight land that overlaps with an adjacent single-flight land to form a doubleflight section between the feed zone and the compression zone and between the compression zone and the metering zone.

* * * * *